Oct. 23, 1956 R. A. SCHULTZ 2,767,460
TURBINE BLADE AND METHOD OF MAKING SAME
Filed Feb. 8, 1950 2 Sheets-Sheet 1
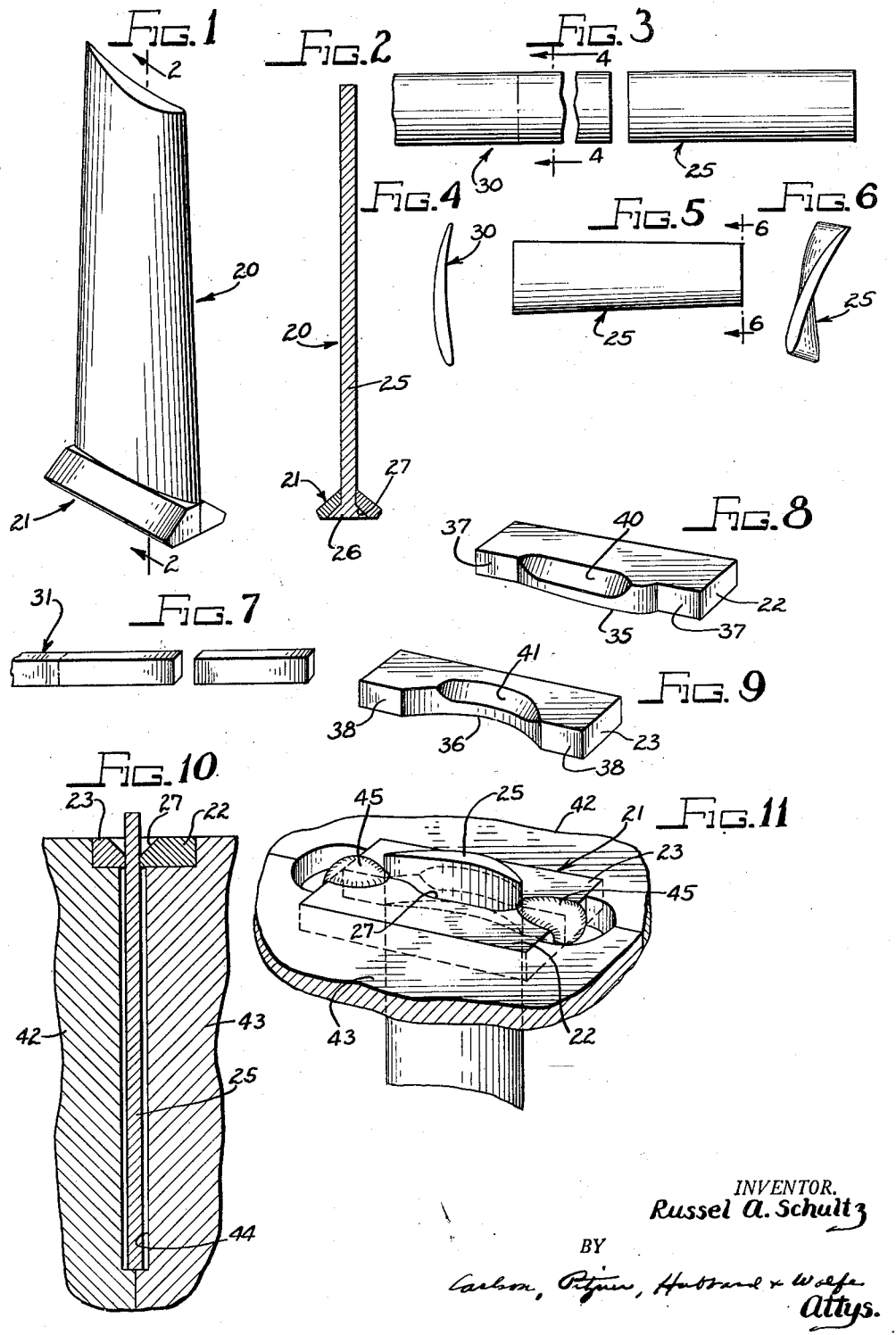
INVENTOR.
Russel A. Schultz Oct. 23, 1956 R. A. SCHULTZ 2,767,460
TURBINE BLADE AND METHOD OF MAKING SAME
Filed Feb. 8, 1950 2 Sheets-Sheet 2
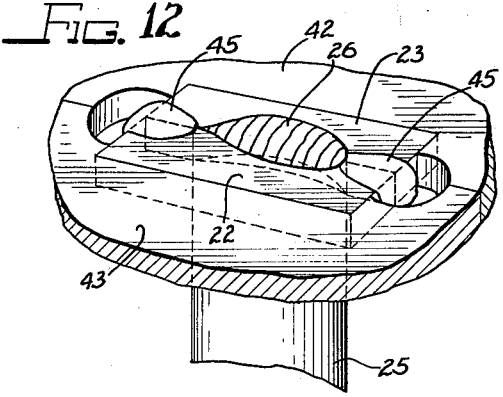
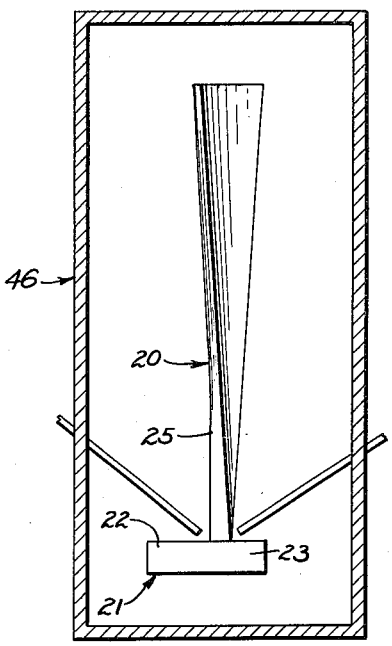
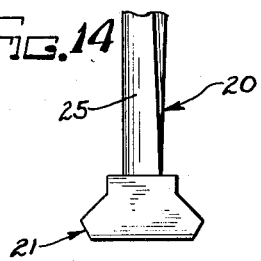
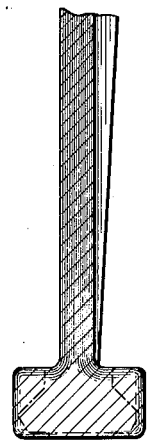
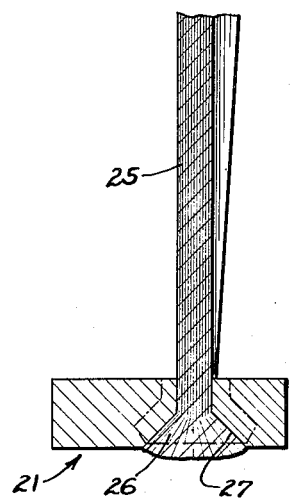
INVENTOR.
Russel A. Schultz
BY
Carlson, Pitzner, Hubbard & Wolfe
Attys.

United States Patent Office 2,767,460
Patented Oct. 23, 1956

2,767,460

TURBINE BLADE AND METHOD OF MAKING SAME

Russel A. Schultz, Detroit, Mich., assignor to Robbins Engineering Company, Detroit, Mich., a corporation of Michigan Application February 8, 1950, Serial No. 143,011

4 Claims. (Cl. 29—156.8)

The invention relates to the construction of blades for steam turbines, gas turbines, turbo-compressors and similar machines, and more particularly to the construction of blades which have at one end a root element for securing the blade to a supporting structure. Heretofore turbine blades of the above general character have been constructed from a single piece of stock by forging and machining operations. This method of production requires expensive dies and forging apparatus. Moreover, the relatively complicated shaping of the blade and the high degree of precision required with respect to dimensions and to the relationship of the blade and root elements make machining very difficult and costly. Production costs of the blades have therefore been extremely high.

Turbine blades produced in the above manner are subject to inherent weaknesses, particularly at the point of changing section, as at the junction of the blade and root elements. This is apparently occasioned by the over-stressing of the metal in the forging of the blade and is only partly removed by annealing, normalizing or other heat treatments conventionally employed. Even when liberal fillets are provided at such points the blades exhibit a definite tendency to develop minute cracks which predispose them to failure under the severe conditions to which they are subjected in use and particularly when the blades are subjected to the high temperatures and extreme temperature changes encountered in gas turbines.

The general object of the invention is to provide a turbine blade which is entirely free of the weaknesses inherent in blades as heretofore constructed.

Another object is to provide a construction which permits the blade and root elements to be made of the material best suited for the particular functions the elements are required to perform.

Still another object is to provide a blade of composite construction in which the internal structures of the blade and root elements and particularly the flow lines developed in the initial working of the material from which the elements are constructed are oriented so as to afford the greatest strength and durability.

A further object is to provide a turbine blade particularly adapted for production in accordance with a novel method of manufacture which materially reduces the cost of the blade.

It is also an object of the invention to provide an improved method of making turbine blades which in addition to reducing costs, produces a stronger, more durable and more dependable blade.

Other objects and advantages of the invention will become apparent from the following detailed description of the preferred form of the turbine blade and the method of production described hereinafter, reference being had to the accompanying drawings in which:

Figure 1 is a perspective view of a turbine blade of the general type with which the invention is concerned.

Fig. 2 is a longitudinal sectional view of the blade taken in a vertical plane substantially on the line 2—2 of Fig. 1.

Fig. 3 is a diagrammatic view illustrating the blade stock as sectioned for individual blade elements.

Fig. 4 is a transverse sectional view of the blade stock taken in a vertical plane substantially on the line 4—4 of Fig. 3.

Fig. 5 is a view showing a blade stock section twisted on its longitudinal axis into the form required for the finished blade.

Fig. 6 is an end view of the twisted blade section taken in a vertical plane substantially on the line 6—6 of Fig. 5.

Fig. 7 is a diagrammatic view illustrating a piece of stock as cut to provide the sections of the root element.

Fig. 8 is a perspective view of one section of the root element shaped for assembly with the blade element.

Fig. 9 is a perspective view of the companion section of the root element shaped for assembly with the blade element.

Fig. 10 is a sectional view showing the manner in which the blade and root elements are initially assembled.

Fig. 11 is a fragmentary perspective view showing the blade and root elements temporarily joined by tack welding.

Fig. 12 is a perspective view similar to Fig. 11 showing the blade element peened over into the pocket provided in the root elements.

Fig. 13 is a diagrammatic view illustrating the step of joining the blade and root elements by a brazing operation.

Fig. 14 is a fragmentary view of the root end of the blade with the root elements machined to their final form.

Fig. 15 is a diagrammatic view illustrating the internal structure of a turbine blade made in accordance with the conventional practice.

Fig. 16 is a diagrammatic view illustrating the internal structure of a turbine blade formed in accordance with applicant's improved method.

Referring to Fig. 1 of the drawings, a turbine blade of the type with which the present invention is concerned comprises an elongated blade portion 20 with an enlarged transversely disposed root portion 21 at one end. The blade portion 20 as shown is of airfoil cross-section and is twisted slightly on its longitudinal axis into generally spiral configuration to provide the desired air flow characteristics. Attachment of the blade to the supporting structure of the turbine is effected by means of the root portion 21 which is suitably shaped for interlocking engagement in a complementally-shaped slot or socket in the structure, a conventional dovetailed root being shown in the exemplary blade.

In accordance with the invention the blade and root portions 20 and 21 are formed as separate elements, the latter being constructed in two sections 22 and 23 (Figs. 8 and 9) and then assembled and permanently secured together as by welding or brazing to constitute a unitary structure. The blade element in its ultimate form (as shown in Fig. 2) comprises an elongated strip 25 of alloy steel or other suitable material and of airfoil cross-section having a relatively small tapering or wedge-shaped enlargement 26 at its inner or root end. This enlargement and the adjacent portion of the blade strip are adapted to fit into a complementally-shaped pocket 27 in the root element 21 and provides a strong joint capable of resisting separation of the parts by the centrifugal forces acting on the blade element in operation.

To provide maximum strength and durability, the blade strip 25 is initially formed or cut from the stock material in a manner such that the flow lines produced in the working of the material extend parallel to each other and to the longitudinal axis of the strip. The enlargement 26 may be most conveniently formed by upsetting the end portion of the strip 25 and its tapered or wedge-shaped contour results in a minimum disturbance in the orientation of the flow lines. More particularly, sharp bends or folds in the flow lines are effectually avoided and the slight changes in direction of the flow lines that necessarily occur are located well within the root element of the finished blade. The blade element itself is therefore free of any tendency to develop cracks at its juncture with the root element.

The root element sections 22 and 23 are also formed or cut from the stock material in such a way that the flow lines of the material are parallel to each other and to the longitudinal axes of the sections. Since these sections and the blade element are formed separately, the material employed for each may be that best suited for the functions to be performed by the respective parts.

The improved turbine blade lends itself particularly well to production in accordance with a novel method of manufacture which materially reduces costs. Thus the blade element strip 25 may be cut from a relatively long strip 30 of the stock which can be produced at low cost by rolling, drawing or other conventional forming methods. Stock so produced has a particularly satisfactory internal structure since the flow lines produced in the working of the material are all parallel to each other and to the longitudinal axis of the strip.

In the exemplary turbine blade the blade element 20 is of generally spiral configuration, that is, it has a relatively small twist about its longitudinal axis that can be seen best by reference to Figs. 1 and 6 of the drawings. This twist may be imparted to the blade strip 25 after it has been severed from the stock strip 30 and before assembly with the root element 21.

The sections 22 and 23 of the root element 21 may also be cut from elongated strips 31 of rolled or drawn stock. As shown in Fig. 7, the stock strips are generally rectangular in cross-section and in practice it is found most convenient to use a slightly wider strip for the production of the sections 22 than those used for the sections 23. The sections are cut from the strip of course so that the flow lines of the material extend longitudinally thereof, such flow lines being parallel to each other and to the longitudinal axes of the respective sections.

The construction of the root element 21 in two sections greatly facilitates the formation of the blade receiving pocket 27 in the element. In Figs. 8 and 9 the sections 22 and 23 have been shown inverted and with their inner edges facing in the same direction, that is forwardly, but it will be understood that when assembled those edges are adjacent or in abutting relation as shown in Fig. 11. As will be seen by reference to Figures 8 and 9, the adjacent edges of the sections 22 and 23 are complementally shaped for closely fitting engagement with opposite faces of the blade strip 25. Thus the edge of the section 22 is formed by grinding or other suitable machining operation to present a generally convex projecting portion 35 adapted to fit accurately against the concave face of the blade strip. Section 23 on the other hand has its edge portion formed with a concave depression 36 conforming to the curvature of the convex face of the blade strip and adapted to fit accurately against the same. At each end of these curved portions the sections are formed respectively with flat faces 37 and 38. To complete the shaping of the pocket 27, the lower edges of the formed portions of root sections 22 and 23 are chamfered as at 40 and 41. Accordingly, upon assembly of the sections, the pocket presents an upper or neck portion conforming in shape to the cross-section of the blade element and an outwardly flaring generally wedge-shaped portion for the accommodation of the enlargement 26.

While the enlargement 26 may be formed on the blade strip 25 at any preferred stage in the manufacturing process, it is preferred to form it after assembly of the strip with the root sections 22 and 23. Thus in the initial assembly step, the sections 22 and 23 with the blade strip 25 interposed between them are placed in a suitable jig or fixture arranged to locate parts in proper relation to each other. This fixture, as shown in Fig. 10, has a pair of recessed jaws 42 and 43 for receiving the root sections and a relatively deep recess between the jaws for receiving the blade strip. The latter recess may be dimensioned to constitute a gauge for accurately locating the root elements and blade strip longitudinally of the latter.

In practice it is preferred to dimension the pocket 27 so that a substantial pressure is required to bring the abutting faces 37 and 38 of the root sections into engagement. More particularly, the pocket is dimensioned so that the clamping of the root sections together produces a slight embossing effect in the surface of the blade strip. With the root elements thus clamped together, the parts are permanently secured together as by tack welds 45 applied at opposite ends of the root element and preferably overlapping the adjacent edges of the blade strip 25, as shown in Fig. 11. It will be observed that the projecting end of the blade strip extends sufficiently beyond the lower surface of the root element to provide ample stock for the enlargement 26. With the parts still clamped in the assembly fixture or in a similar fixture, the projecting end portion of the blade strip 25 is upset to form the enlargement 26. This upsetting may be conveniently effected by peening over the projecting end so that the pocket 27 is completely filled. Any excess stock may be removed in the final machining operations.

To further strengthen the assembly and to insure a complete and permanent junction, the blade strip and root sections are additionally secured together by connecting means such as metal applied to the structure in a molten state. As herein shown, the joint between the blade element and root sections is brazed with copper or other suitable brazing metal. This brazing operation may be carried out in the conventional manner in a heated chamber 46 (as shown in Fig. 13) and, in the case of copper brazing, the operation is carried out in an atmosphere of hydrogen or other reducing gas.

As a final step of the manufacturing process the root element of the blade is machined to its final shape, as shown in Fig. 14. It will be understood, of course, that the blade portion may be subjected to a grinding or polishing operation if desired.

It will be apparent from the foregoing that the invention provides a turbine blade of novel and improved construction. The blade and root portions are formed separately and in a manner which disposes the flow lines of the material so as to insure maximum strength and durability. In this connection reference may be had to Figs. 15 and 16 of the drawings which respectively show the flow line arrangement of a blade formed by the conventional method and a blade formed in accordance with the improved method. Thus in the conventionally manufactured blade as shown in Fig. 15, the flow lines of the material at the juncture of the blade and root elements are bent substantially at right angles and then folded back upon themselves. In the blade manufactured in accordance with the present invention as shown in Fig. 16, the flow lines of the blade element are parallel to each other and to the axis of the element through the major portions of its length and are displaced only adjacent the root end and well within the root element. Displacement of the flow lines in this case is very small. Moreover, the flow lines of the root element are disposed so as to most effectively resist the stresses imposed thereon.

The improved turbine blade may be manufactured in accordance with a novel method which materially reduces the cost of the blades. Separate forming of the parts of the blade permits the use of strip stock which can be produced inexpensively and which moreover has a particularly satisfactory internal structure. Construction of the root element in two separate parts is especially advantageous since it permits formation of the blade receiving pocket by simple and inexpensive machining operations. The blade element itself may be constructed of stock having the desired airfoil section so that expensive pattern controlled machining operations necessary to generate the airfoil contour when the blade is made from a solid block or from a rough forging are entirely eliminated. Thus the improved construction not only substantially reduces the cost of manufacture of turbine blades, but it results in the production of a blade of great strength and durability and particularly one which has no tendency to develop cracks or weakness at the juncture of the blade and root elements.

I claim as my invention:

1. The method of manufacturing turbine blades of the type having blade and root elements which comprises, cutting the blade element from an elongated strip of stock material having a cross-section corresponding generally to that of the finished blade element, forming two separate strips of material to define when assembled in side by side relation a pocket flaring outwardly at one end and dimensioned to fit tightly against opposite sides of the blade element adjacent the other end, assembling the two strips in side-by-side relation with the blade element extending into said pocket and projecting slightly beyond the flared section of the pocket, clamping the strips together against the blade element, securing the clamped strips and blade element together by tack welds, upsetting the projecting end of the blade element, and brazing the joint between the strips and the blade element.

2. The method of manufacturing turbine blades having blade elements of airfoil cross-section and root elements for attaching the blade to supporting structures which comprises the steps of forming the blade elements from strip stock having a cross-sectional shape corresponding to that of the finished blade, forming the root element in two sections each cut from strip stock, shaping the sections to define when assembled together a pocket dimensioned at one end for closely fitting engagement with opposite sides of the blade element and flaring outwardly at the other end, assembling the sections and the element with the latter extending through the pocket and projecting into the flaring portion thereof temporarily securing the sections and the element together by tack welds, upsetting one end of the blade element in the flaring portion of the pocket to lock it securely to the sections, brazing the joint between the sections and the blade element, and finish machining the sections to the required shape of the root element.

3. The method of manufacturing turbine blades of the type having blade elements of airfoil cross-section and root elements for attaching the blades to supporting structures, said method comprising the steps of cutting the blade element from an elongated strip of rolled or drawn stock having a cross-section corresponding generally to that of the finished blade element, cutting from rolled or drawn stock of generally rectangular cross-section two pieces each slightly longer than the width of the blade element, machining one edge of each piece to define when assembled in edge-to-edge relation a pocket having its upper portion shaped to fit closely around the blade element and its lower portion tapering outwardly therefrom, assembling the pieces and blade element with the end portion of the latter projecting beyond the tapered portion of the pocket, securing said pieces and the blade element together by tack welds at opposite ends of the pieces, upsetting the projecting end of the blade element to fill the tapered portion of the pocket, copper brazing the joint between pieces and the root element, and machining the pieces and the adjacent upset end of the blade element to the shape required for the root element.

4. The method of manufacturing turbine blades of the type having blade elements of airfoil cross-section and root elements for attaching the blades to supporting structures, said method comprising the steps of cutting the blade element from an elongated strip of rolled or drawn stock having a cross-section corresponding generally to that of the finished blade element, cutting from rolled or drawn stock of generally rectangular cross-section two pieces each slightly longer than the width of the blade element, machining one edge of each piece to define when assembled in edge-to-edge relation a pocket having its upper portion shaped to fit closely around the blade element and its lower portion tapering outwardly therefrom, assembling the pieces and blade element with the end portion of the latter projecting beyond the tapered portion of the pocket, temporarily securing said pieces and the blade element together by tack welds at opposite ends of the sections, upsetting the projecting end of the blade element to fill the tapered portion of the pocket, permanently securing the pieces together and to the element by applying to the abutting surfaces metal in a molten state and machining the two pieces and the adjacent upset end of the blade element to the shape required for the root element.

References Cited in the file of this patent

UNITED STATES PATENTS

| | | |
|---|---|---|
| 1,142,690 | Francke | June 8, 1915 |
| 1,470,506 | Steenstrup | Oct. 9, 1923 |
| 1,516,607 | Johanson | Nov. 25, 1924 |
| 1,530,249 | Eveleth | Mar. 17, 1925 |
| 1,942,608 | Ljungstrom | Jan. 9, 1934 |
| 2,063,706 | Soderberg | Dec. 8, 1936 |
| 2,205,132 | Blanchard | June 18, 1940 |
| 2,237,121 | Stine | Apr. 1, 1941 |
| 2,264,897 | Becker | Dec. 2, 1941 |
| 2,673,709 | Barnes | Mar. 30, 1954 |

FOREIGN PATENTS

| | | |
|---|---|---|
| 375,059 | France | May 2, 1906 |
| 391,880 | Germany | July 29, 1924 |
| 574,440 | Great Britain | Jan. 4, 1946 |
| 580,898 | Germany | Nov. 13, 1933 |